United States Patent
Kim et al.

(10) Patent No.: US 10,001,176 B2
(45) Date of Patent: Jun. 19, 2018

(54) APPARATUS FOR ADJUSTING CLEARANCE OF CLUTCH CABLE FOR VEHICLE

(71) Applicants: Hyundai Motor Company, Seoul (KR); Kia Motors Corporation, Seoul (KR)

(72) Inventors: Yeong Jik Kim, Chungcheongbuk-do (KR); Min Su Kang, Gyeonggi-do (KR); Sung Keun Lim, Gyeonggi-do (KR); Woo Duck Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 129 days.

(21) Appl. No.: 14/950,280

(22) Filed: Nov. 24, 2015

(65) Prior Publication Data
US 2017/0045094 A1    Feb. 16, 2017

(30) Foreign Application Priority Data
Aug. 12, 2015    (KR) .................. 10-2015-0113600

(51) Int. Cl.
| F16C 1/10 | (2006.01) |
| F16D 13/75 | (2006.01) |
| F16C 1/26 | (2006.01) |
| F16C 1/22 | (2006.01) |
| F16C 1/14 | (2006.01) |

(52) U.S. Cl.
CPC ............. *F16D 13/752* (2013.01); *F16C 1/14* (2013.01); *F16C 1/223* (2013.01); *F16C 1/226* (2013.01); *F16C 1/262* (2013.01); *F16C 2361/43* (2013.01)

(58) Field of Classification Search
CPC ...... F16C 1/226; F16C 1/262; F16C 2361/43; F16D 13/752
See application file for complete search history.

(56) References Cited

U.S. PATENT DOCUMENTS 5,813,290 A * 9/1998 Takahashi ............... F16C 1/223
                                                            192/111.12
8,156,841 B2 * 4/2012 Yasuda .................. B60K 23/08
                                                            74/473.21

FOREIGN PATENT DOCUMENTS

| DE | 2301388 A1 * | 7/1974 | ............... F16C 1/22 |
| FR | 2611832 A3 * | 9/1988 | ......... F16B 37/0857 |
| FR | 2964915 A1 * | 3/2012 | ............... F16C 1/22 |
| JP | 2005-024039 A | 1/2005 | |
| KR | 10-0139989 B1 | 3/1998 | |
| KR | 20-1998-064492 U | 11/1998 | |
| KR | 2000-0015825 U | 8/2000 | |
| KR | 10-0790522 B1 | 1/2008 | |
| KR | 10-1481341 B1 | 1/2015 | |

* cited by examiner

*Primary Examiner* — Vicky A Johnson
(74) *Attorney, Agent, or Firm* — Mintz Levin Cohn Ferris Glovsky and Popeo, P.C.; Peter F. Corless (57) ABSTRACT

An apparatus for adjusting a clearance of a clutch cable for a vehicle is arranged to rotate a clutch pedal forward using an elastic force of a reverse return spring to allow a back surface of the clutch pedal be spaced apart from a pedal member, control a length of the clutch cable using a mechanical clearance adjusting mechanism, and secure a uniform gap between the pedal member and a back surface of the clutch pedal by adjusting the length of the clutch cable.

13 Claims, 11 Drawing Sheets

APPARATUS FOR ADJUSTING CLEARANCE OF CLUTCH CABLE FOR VEHICLE

CROSS REFERENCE TO RELATED APPLICATION

The present application claims under 35 U.S.C. § 119(a) the benefit of Korean Patent Application No. 10-2015-0113600, filed Aug. 12, 2015, the entire contents of which are incorporated by reference herein.

BACKGROUND

1. Technical Field

The present invention relates to an apparatus for adjusting a clearance of a clutch cable for a vehicle, and more particularly, to an apparatus for adjusting a clearance of a clutch cable by securing a uniform gap between a pedal member and a clutch pedal.

2. Description of the Related Art

Figure 1:
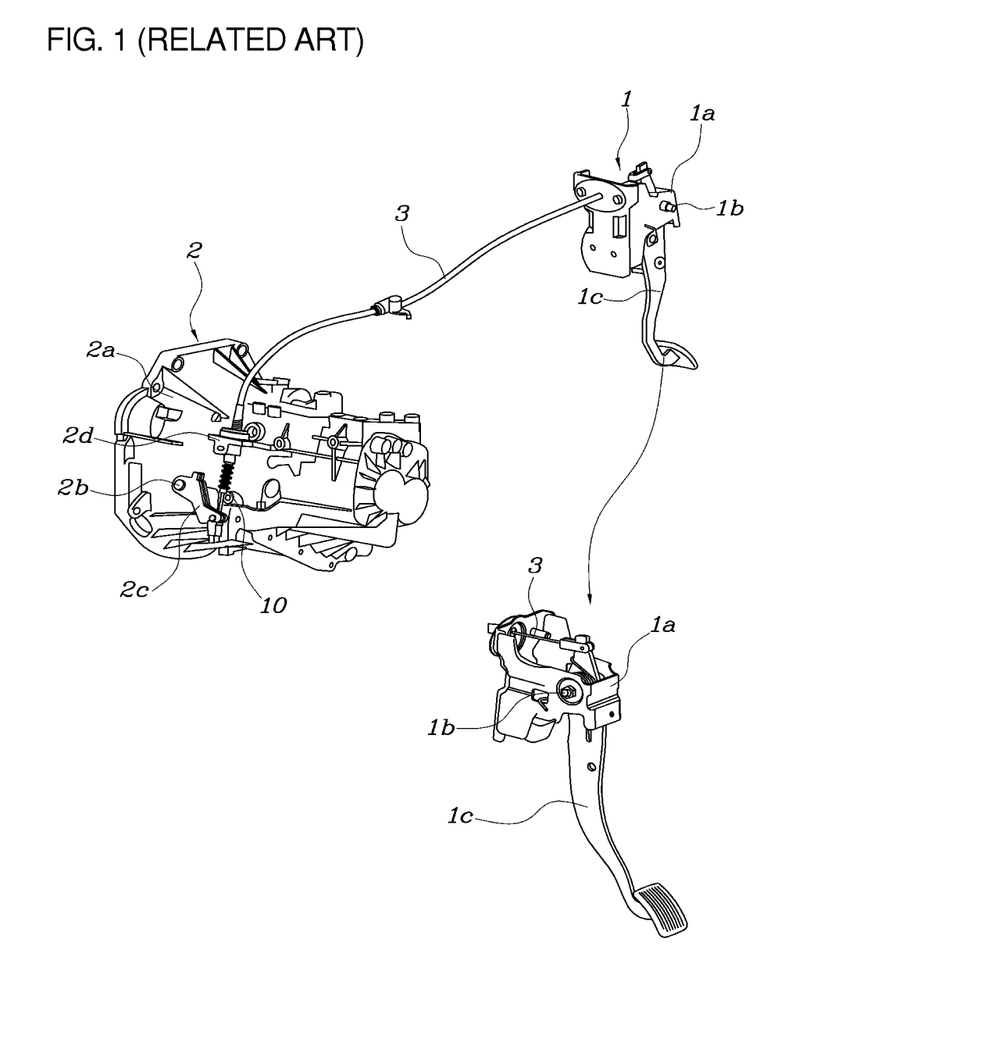
FIGS. 1 to 3 (RELATED ART) depict an apparatus for adjusting a clearance of a clutch cable according to the related art.

A clutch apparatus for a vehicle is installed between a flywheel and an input shaft of a transmission to interrupt power of an engine transferred to the transmission if necessary. As shown in FIG. 1 (RELATED ART), a cable type clutch apparatus includes a clutch pedal side apparatus 1 operated by a driver, a clutch body side apparatus 2 installed between the engine and the transmission, and a clutch cable 3 connecting the clutch pedal side apparatus 1 and the clutch body side apparatus 2.

In this configuration, the clutch pedal side apparatus 1 includes a pedal member 1a fixedly installed to a vehicle body under a driver's seat and a clutch pedal 1c rotatably coupled with the pedal member 1a forward and backward on the basis of a hinge shaft 1b.

Further, the clutch body side apparatus 2 includes a release lever 2c rotatably installed at a clutch cover 2a based on a lever shaft 2b.

Figure 2:
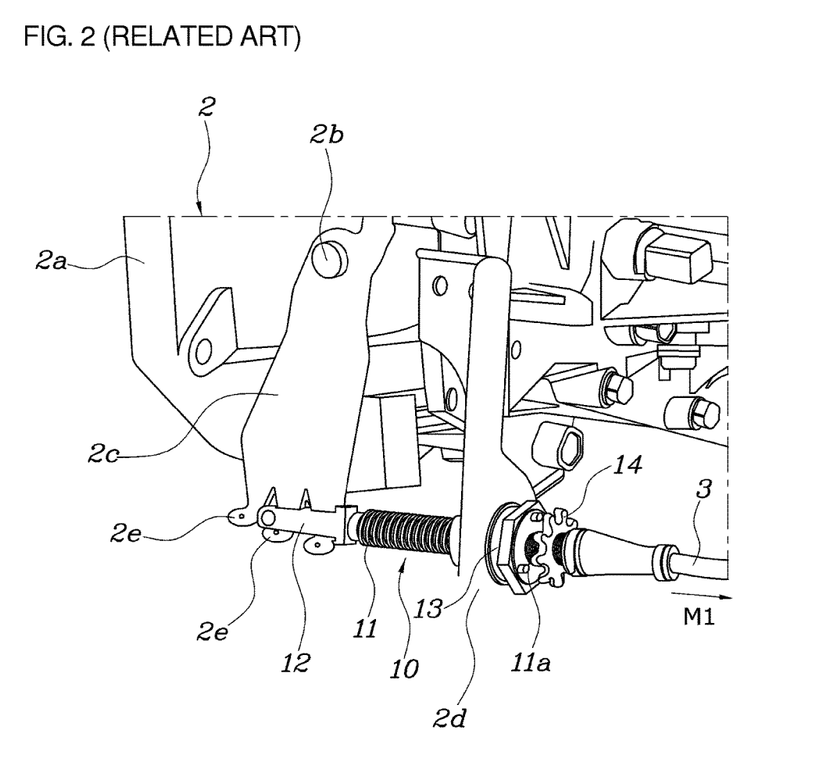
Figure 3:
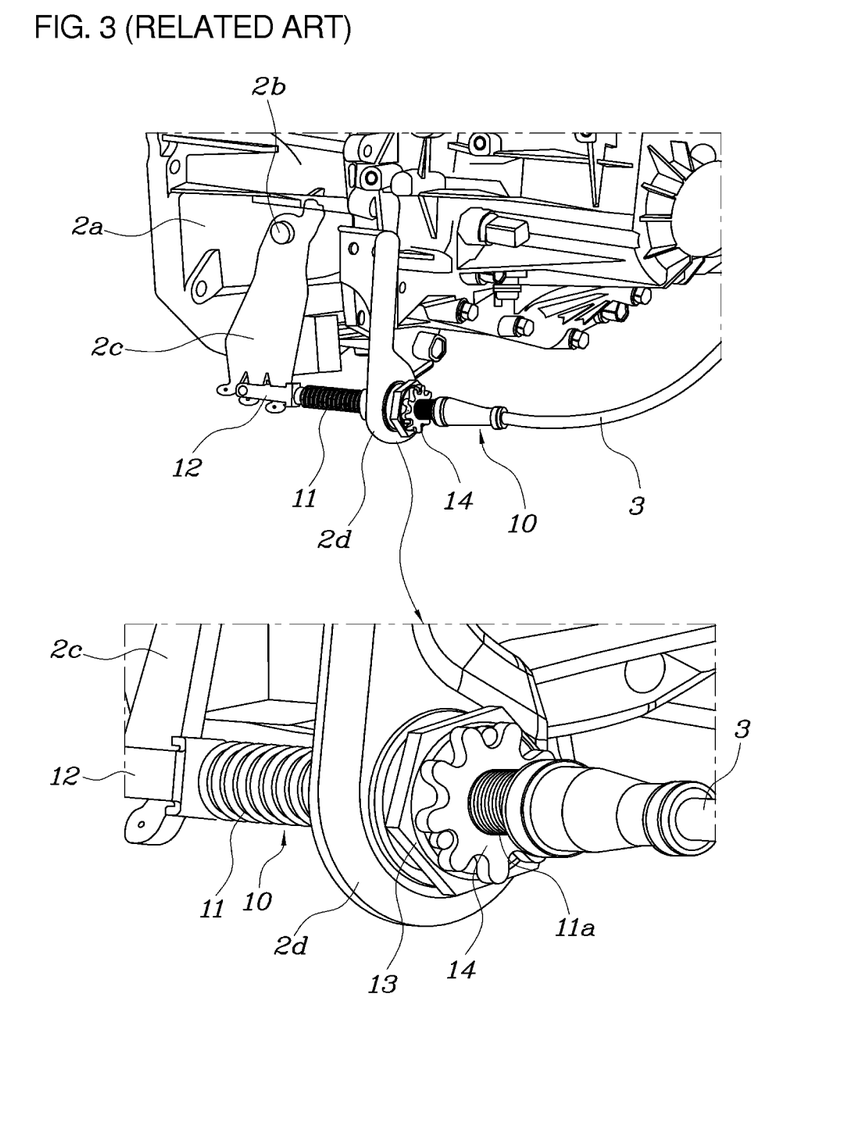

Meanwhile, one end of the clutch cable 3 is coupled with an upper portion of the clutch pedal 1c and the other end thereof is coupled with a clearance adjusting apparatus 10, as shown in FIGS. 2 and 3 (RELATED ART). In this case, an end of the clearance adjusting apparatus 10 is connected to the release lever 2c.

The clearance adjusting apparatus 10 includes a cable rod 11 coupled with the clutch cable 3 and having an outer circumferential surface provided with a thread 11a, a cable end 12 coupled with an end of the cable rod 11 and coupled with the release lever 2c, a damper 13 coupled with the cable rod 11, and an adjusting nut 14 coupled with the thread 11a of the cable rod 11.

Therefore, a guide bracket 2d coupled with the clutch cover 2a penetrates from the cable end 12, and then the cable end 12 is inserted between hooks 2e of the release lever 2c, and the clutch cable 3 is pulled in an arrow M1 direction as shown to lock the cable end 12 to the hook 2e of the release lever 2c.

If the clutch cable 3 is pulled in the arrow M1 direction, a gap between the cable end 12 and the release lever 2c disappears to fix a position of the cable end 12, but a gap occurs between the damper 13 and the adjusting nut 14. Therefore, finally, the adjusting nut 14 rotates to remove the gap between the damper 13 and the adjusting nut 14, and the adjusting nut 14 is closely fixed to the damper 13 to complete the clearance adjustment of the clutch cable 3.

However, the existing clearance adjusting apparatus 10 as described above has a structure in which workers manually pull the clutch cable 3 to adjust a clearance. In this case, since forces (i.e., forces pulling the clutch cable 3 in the arrow M1 direction) of each worker pulling the clutch cable 3 are different, the gap between the pedal member 1a and the clutch pedal 1c may be non-uniform for each product, thereby causing a quality problem when the vehicle is released.

Further, if the gap between the pedal member 1a and the clutch pedal 1c is different for each product as the force of each worker pulling the clutch cable 3 is different, a free play of the clutch pedal 1c is also different for each product and a surplus stroke of the clutch pedal 1c is also different for each product, thereby causing a quality problem when the vehicle is released.

Here, the free play is a section in which the clutch is not substantially operated when the clutch pedal 1c returning to an initial position is depressed by a driver and only the clutch pedal 1c idles forward. In other words, the free play means a section in which the clutch pedal 1c idles forward until a clutch disk starts to operate after each clearance between parts of the clutch disappears upon the initial operation of the clutch pedal 1c.

The reason for setting the free play as described above is to sufficiently move a pressure plate toward a flywheel with a force of a diaphragm spring when the clutch disk is worn due to the continuous use of the clutch. By doing so, a slip occurrence is prevented between the flywheel and the clutch disk to prevent the clutch disk from being damaged at an early stage.

Further, the surplus stroke is a pedal stroke from the time when the driver takes his/her foot off the clutch pedal 1c in a full stroke state of the clutch pedal 1c to the time when the clutch disk starts to contact the flywheel and if the surplus stroke is differently set for each product, the quality problem may occur upon the operation of the clutch.

The contents described as the related art have been provided only for assisting in the understanding for the background of the present invention and should not be considered as corresponding to the related art known to those skilled in the art.

SUMMARY

An object of the present invention is to provide an apparatus for adjusting a clearance of a clutch cable for a vehicle capable of uniformly securing a free play and a surplus stroke of a clutch pedal to improve quality of a released product, by adjusting a length of a clutch cable using a mechanical clearance adjusting mechanism, rather than adjusting the clearance by a force of a worker pulling the clutch cable, and securing a uniform gap between a pedal member and a clutch pedal by adjusting the length of the clutch cable.

According to an exemplary embodiment of the present invention, there is provided an apparatus for adjusting a clearance of a clutch cable for a vehicle, including: a reverse return spring configured to connect a pedal member to a clutch pedal and provide an elastic force to the clutch pedal to make a free play of the clutch pedal zero when the clutch pedal returns to an initial position; a cable rod configured to have one end connected to the clutch cable and the other end penetrating through a release lever; and a clearance adjusting mechanism configured to be coupled with the end of the cable rod and contact the release lever so as to adjust a gap between the pedal member and the clutch pedal by adjusting a length of the clutch cable in a state in which the clutch pedal rotates forward by the elastic force of the reverse return spring.

The clutch pedal may be rotatably coupled with the pedal member forward and backward based on a hinge shaft, the clutch cable may be coupled with an upper portion of the clutch pedal which is positioned at an upper portion based on the hinge shaft, and a lower portion of the clutch pedal may rotate forward based on the hinge shaft by the elastic force of the reverse return spring and an upper portion thereof coupled with the clutch cable may rotate backward.

The reverse return spring may have one end coupled with a side surface of the pedal member and the other end coupled with a front surface of the clutch pedal while penetrating through the hinge shaft of the clutch pedal.

Both ends of the reverse return spring may be configured to be positioned at the lower portion and the upper portion based on the hinge shaft.

The clearance adjusting mechanism may include: an end stopper configured to penetrate through the end of the cable rod and be supported to the release lever; a middle member configured to penetrate through the end of the cable rod and be supported to the end stopper; and an adjusting nut configured to be screw-connected to the cable rod by penetrating through the end of the cable rod and be supported to the middle member, and the end stopper and the middle member may be movably installed along a length direction of the cable rod and the end of the cable rod may be provided with a thread for screw-connection to the adjusting nut.

The end stopper may be formed in a cylindrical shape and the end stopper formed in the cylindrical shape may be installed in a right angle direction with respect to the length direction of the cable rod to increase a contact area with the release lever.

A portion of the release lever contacting the end stopper may be formed in an arc-shaped curved groove corresponding to an appearance of the end stopper to increase a contact area with the end stopper.

The middle member may include: a damper supported to the end stopper and including elasticity for vibration insulation: and a damper shoe maintaining a shape of the damper, and the end stopper and the damper and the damper and the damper shoe may have a surface contact therebetween to increase a contact area therebetween.

The damper may be made of rubber for vibration insulation.

The damper shoe may be made of plastic having strength to maintain the shape of the damper.

The adjusting nut may include: a screw connection part screw-connecting with the thread of the cable rod; and a support part integrally formed with the screw connection part and supporting the damper shoe, and an end of the support part may be provided with a support groove of an arc curved surface corresponding to the appearance of the damper shoe.

When the damper shoe is separated from a support groove by the rotation of the adjusting nut to be supported to a front end of a support part, the clutch cable may be pulled forward and the clutch pedal may rotate backward to contact a back surface of the clutch pedal with the pedal member and when an appearance of the damper shoe and an appearance of the support groove match each other in the same direction by the rotation of the adjusting nut in a state in which the damper shoe is supported to the front end of the support part, the clutch cable may be pulled backward by the elastic force of the reverse return spring and the adjusting nut may move together with the clutch cable to insert the damper shoe into the support groove, the clutch pedal may rotate forward, and a predetermined gap may be generated between a back surface of the clutch pedal and the pedal member.

The gap generated between the back surface of the clutch pedal and the pedal member may have the same dimension as an interval between a lowest point of the damper shoe and a lowest point of the support groove in the state in which the appearance of the damper shoe and the appearance of the support groove match each other in the same direction by the rotation of the adjusting nut.

DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an apparatus for adjusting a clearance of a clutch cable for a vehicle according to an exemplary embodiment of the present invention will be described with reference to the accompanying drawings and the same components as the related art are denoted by the same reference numerals.

Figure 4:
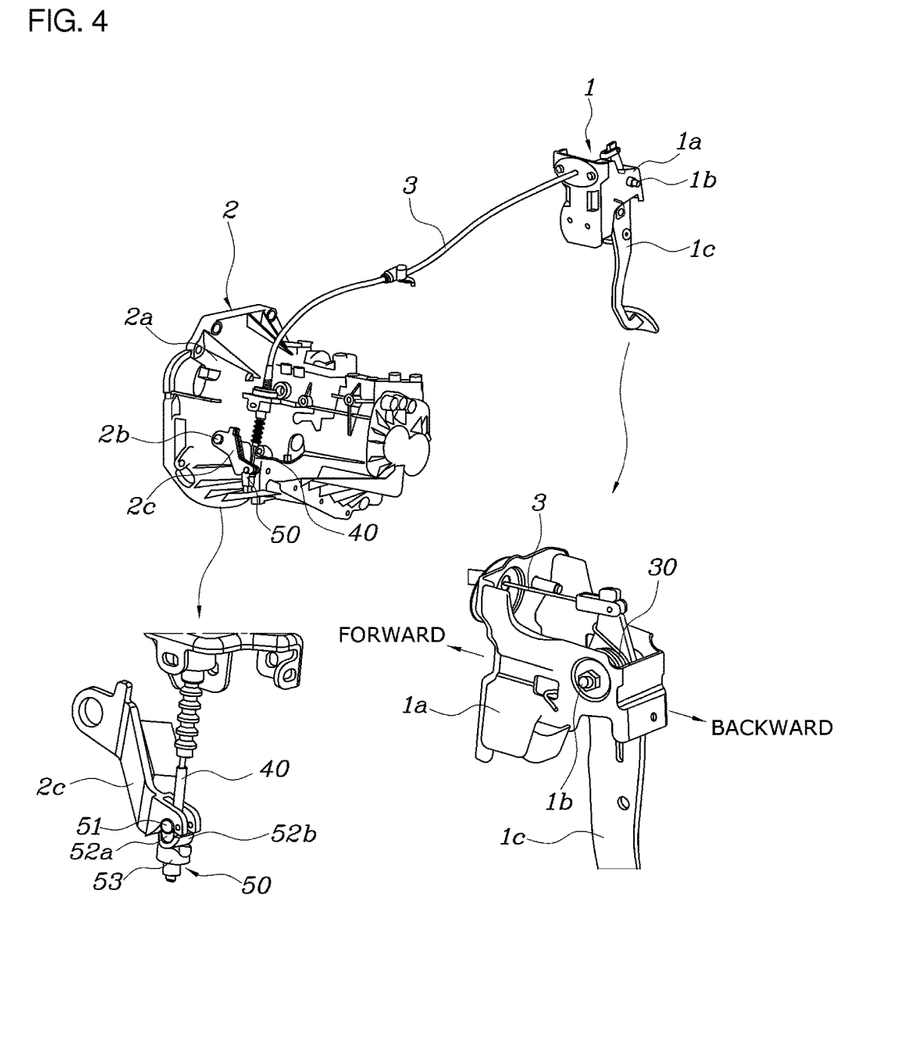
FIGS. 4 to 11 depict an apparatus for adjusting a clearance of a clutch cable according to an exemplary embodiment of the present invention.
Figure 5:
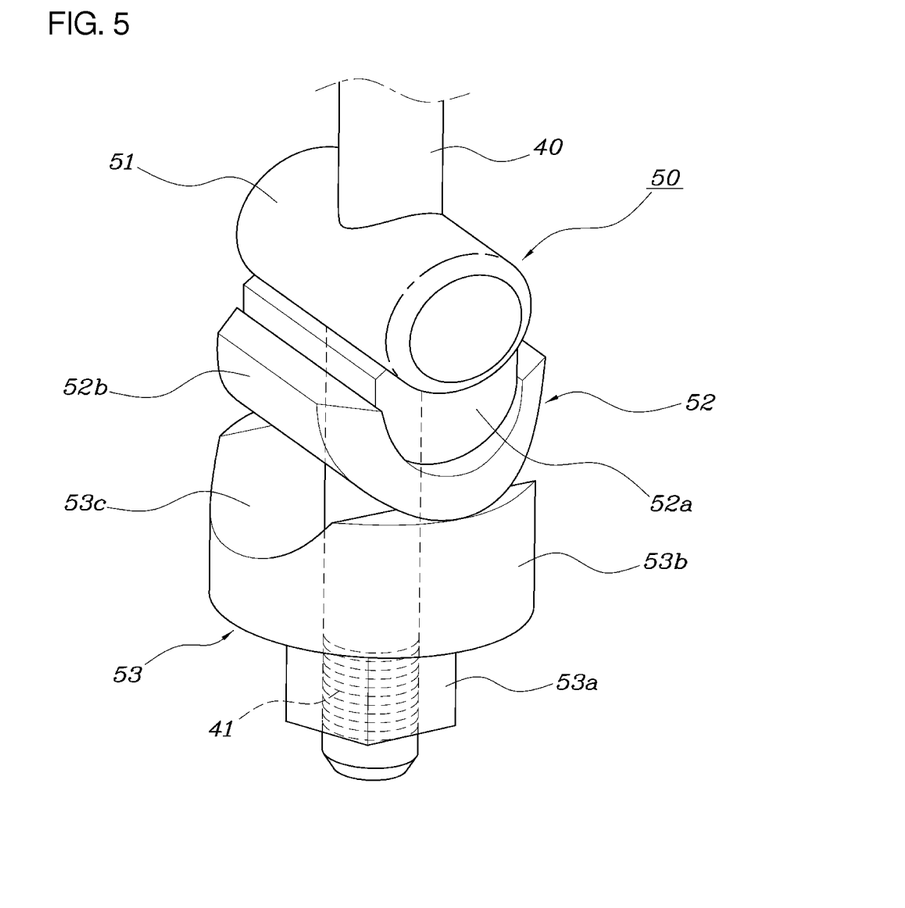

As illustrated in FIG. 4, a cable type clutch apparatus for a vehicle to which the exemplary embodiment of the present invention is applied includes a clutch pedal side apparatus 1 operated by a driver, a clutch body side apparatus 2 installed between an engine and a transmission, and a clutch cable 3 connecting the clutch pedal side apparatus 1 to the clutch body side apparatus 2.

The clutch pedal side apparatus 1 includes a pedal member 1a fixedly installed to a vehicle body under a driver's seat and a clutch pedal 1c rotatably coupled with the pedal member 1a forward and backward based on a hinge shaft 1b.

The clutch body side apparatus 2 includes a release lever 2c rotatably installed at a clutch cover 2a based on a lever shaft 2b.

Meanwhile, as illustrated in FIGS. 4 to 11, the apparatus for adjusting a clearance of a clutch cable for a vehicle according to the exemplary embodiment of the present invention includes: a reverse return spring 30 configured to connect the pedal member 1a to the clutch pedal 1c and providing an elastic force to the clutch pedal 1c to let the clutch pedal 1c rotate forward; a cable rod 40 configured to have one end connected to the clutch cable 3 and the other end penetrating through the release lever 2c; and a clearance adjusting mechanism 50 configured to be coupled with the end of the cable rod 40 and contact the release lever 2c and adjusting a gap between the pedal member 1a and the clutch pedal 1c by adjusting a length of the clutch cable 3 in a state in which the clutch pedal 1c rotates forward by the elastic force of the reverse return spring 30.

The clutch pedal 1c is rotatably coupled with the pedal member 1a forward and backward based on a hinge shaft 1b, the clutch cable 3 is coupled with an upper portion of the clutch pedal 1c which is positioned at an upper portion based on the hinge shaft 1b, and a lower portion of the clutch pedal 1c rotates forward based on the hinge shaft 1b by the elastic force of the reverse return spring 30 and an upper portion thereof coupled with the clutch cable 3 rotates backward.

The reverse return spring 30 has one end coupled with a side surface of the pedal member 1a and the other end coupled with a front surface of the clutch pedal 1c while penetrating through the hinge shaft 1b of the clutch pedal 1b.

When the driver steps on the clutch pedal 1c in the state in which the clutch pedal 1c returns to an initial position (return position, the initial position of the clutch pedal is a state in which the driver does not step on the clutch pedal or does not apply a pedal effort even though he/she steps on the clutch pedal) as the other end of the reverse return spring 30 is coupled with a front surface of the clutch pedal 1c to apply the pedal effort, the elastic force of the reverse return spring 30 applied to the clutch pedal 1c is applied in a direction in which the pedal effort of the driver is alleviated, thereby greatly reducing the fatigue of the driver due to the operation of the clutch pedal 1c.

Further, when the clutch pedal 1c returns to the initial position as the other end of the reverse return spring 30 is coupled with the front surface of the clutch pedal 1c, a free play of the clutch pedal 1c becomes zero by the elastic force of the reverse return spring 30, thereby obtaining fast responsiveness at the time of the operation of the clutch pedal 1c.

Both ends of the reverse return spring 30 are configured to be positioned at the lower portion and the upper portion based on the hinge shaft 1b. By this configuration, the clutch pedal 1c may smoothly return to the initial position by the elastic force of the reverse return spring 30 at the time of the operation of the clutch pedal 1c. In particular, when the clutch pedal 1c returns to the initial position, the free play of the clutch pedal 1c may be maintained in zero.

The reverse return spring 30 is configured to connect the pedal member 1a to the clutch pedal 1c and when the clutch pedal 1c returns to the initial position, serves to provide the elastic force to the clutch pedal 1c to make the free play of the clutch pedal 1c zero.

The clearance adjusting mechanism 50 according to the exemplary embodiment of the present invention includes: an end stopper 51 configured to penetrate through the end of the cable rod 40 and be supported to the release lever 2c; a middle member 52 configured to penetrate through the end of the cable rod 40 and be supported to the end stopper 51; and an adjusting nut 53 configured to be screw-connected to the cable rod 40 by penetrating through the end of the cable rod 40 and be supported to the middle member 52.

The end stopper 51 and the middle member 52 are movably installed along a length direction of the cable rod 40 and the end of the cable rod 40 is provided with a thread 41 for screw-connection to the adjusting nut 53.

The end stopper 51 is formed in a cylindrical shape and the end stopper 51 formed in the cylindrical shape is installed in a right angle direction with respect to the length direction of the cable rod 40 to increase a contact area with the release lever 2c.

When the contact area of the end stopper 51 with the release lever 23c is increased, the operation responsiveness of the release lever 2c depending on the operation of the clutch pedal 1c may be improved and the length of the clutch cable 3 may be more smoothly adjusted at the time of the rotation of the adjusting nut 53, thereby more smoothly adjusting the clearance between the pedal member 1a and the clutch pedal 1c.

A portion of the release lever 2c contacting the end stopper 51 is formed in an arc-shaped curved groove 2d corresponding to an appearance of the end stopper 51 to increase the contact area with the end stopper 51.

The middle member 52 includes: a damper 52a supported to the end stopper 51 and including elasticity for vibration insulation: and a damper shoe 52b maintaining a shape of the damper 52a, and the end stopper 51 and the damper 52a and the damper 52a and the damper shoe 52b have a structure in which they form a surface contact therebetween while the contact surface therebetween being formed in an arc-shaped curvature to increase a contact area therebetween.

As described above, when the end stopper 51 and the damper 52a and the damper 52a and the damper shoe 52b form the surface contact therebetween to increase the contact area, the length of the clutch cable 3 may be more smoothly adjusted at the time of the rotation of the adjusting nut 53, such that the clearance between the pedal member 1a and the clutch pedal 1c may be more smoothly adjusted.

The damper 52a may be made of rubber for vibration insulation and the damper shoe 52b may be made of plastic having strength to maintain the shape of the damper 52, but the material of the damper 52a and the damper shoe 52b is not limited to rubber and plastic.

The adjusting nut 53 includes: a screw connection part 53a screw-connecting with the thread 41 of the cable rod 40; and a support part 53b integrally formed with the screw connection part 53a and supporting the damper shoe 52b, and an end of the support part 53b is provided with a support groove 53c of an arc curved surface corresponding to the appearance of the damper shoe 52b.

Figure 7:
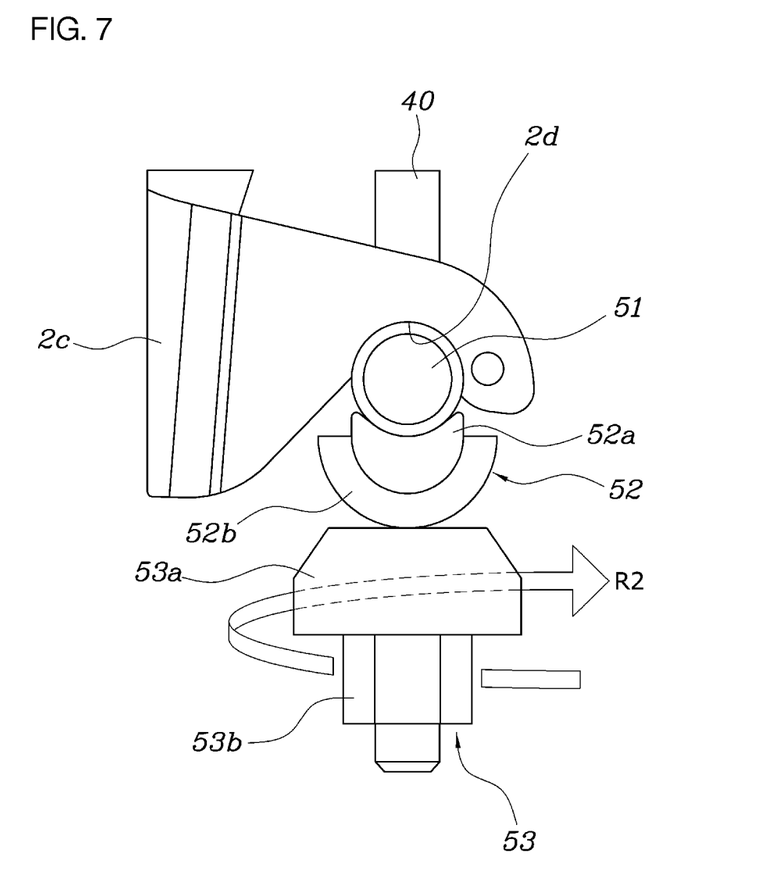
Figure 8:
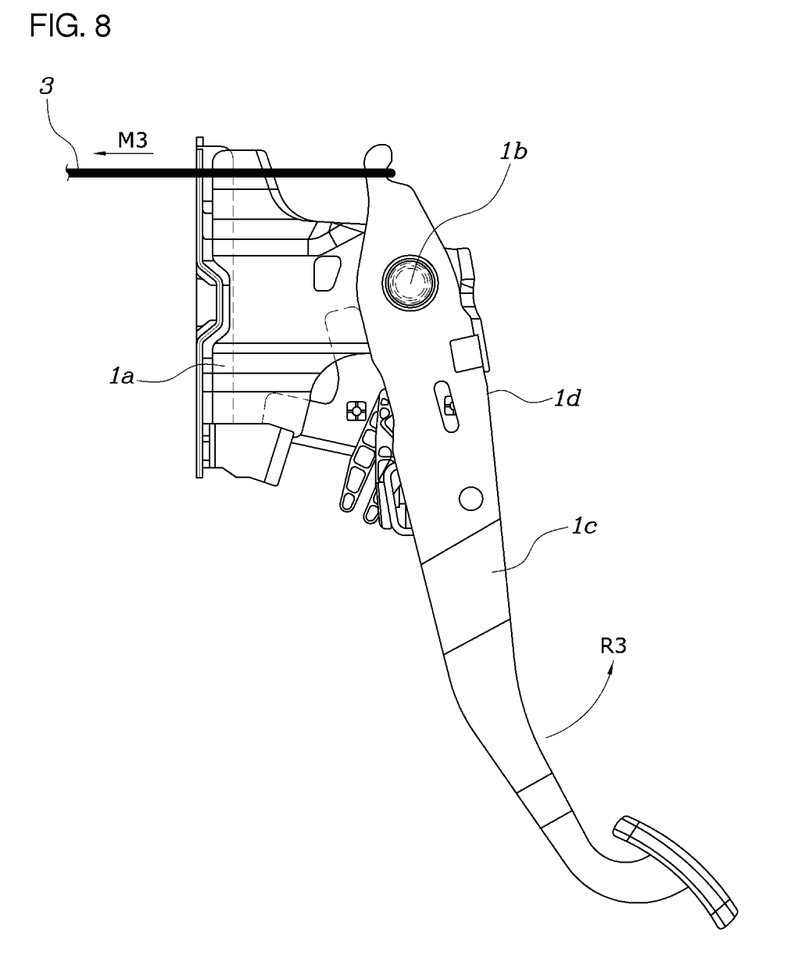

Therefore, when the damper shoe 52b is separated from the support groove 53c by the rotation of the adjusting nut 53 to be supported to a front end of the support part 53b (see FIG. 7), the clutch cable 3 is pulled forward and the clutch pedal 1c rotates backward to contact the back surface 1d of the clutch pedal 1c with the pedal member 1a (see FIG. 8).

Figure 9:
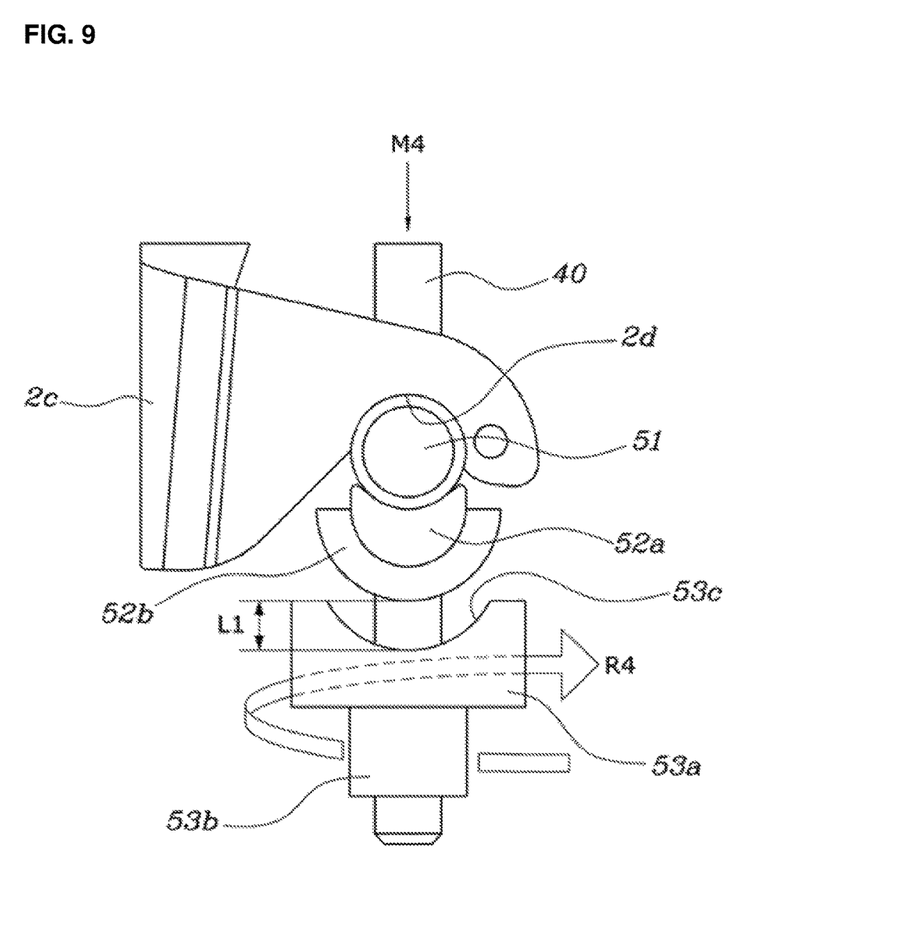
Figure 10:
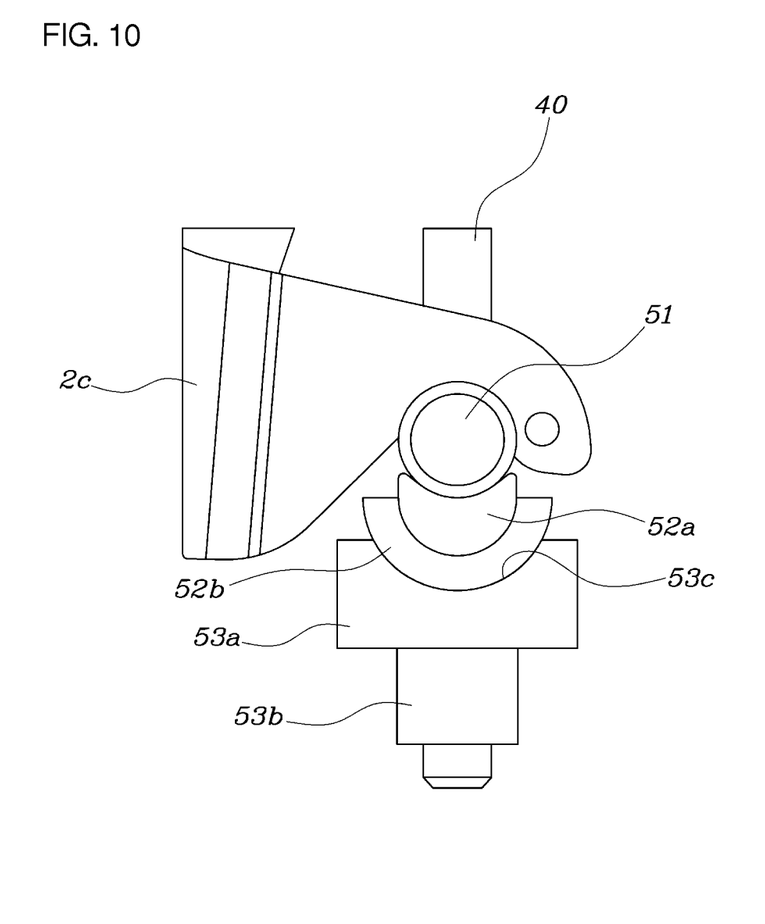
Figure 11:
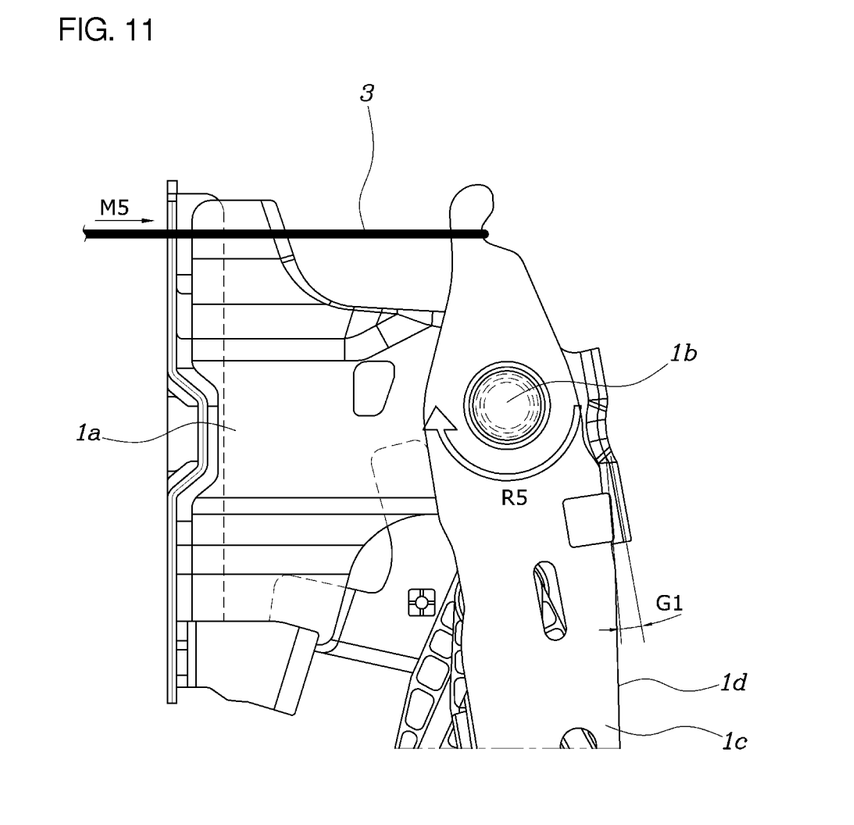

When an appearance of the damper shoe 52b and an appearance of the support groove 53c match each other in the same direction by the rotation of the adjusting nut 53 in a state in which the damper shoe 52b is supported to the front end of the support part 53b (see FIG. 9), the clutch cable 3 is pulled backward by the elastic force of the reverse return spring 30 and the adjusting nut 53 moves together with the clutch cable 3 to insert the damper shoe 52b into the support groove 53c (see FIG. 10), thereby rotating the clutch pedal 1c forward, and generating a predetermined gap G1 between the back surface 1d of the clutch pedal 1c and the pedal member 1a (see FIG. 11). In this case, as illustrated in FIG. 9, the generated gap G1 has the same dimension as an interval L1 between a lowest point of the damper shoe 52b and a lowest point of the support groove 53c in the state in which the appearance of the damper shoe 52b and the appearance of the support groove 53c match each other in the same direction by the rotation of the adjusting nut 53.

Hereinafter, an operation of the exemplary embodiment of the present invention will be described.

Figure 6:
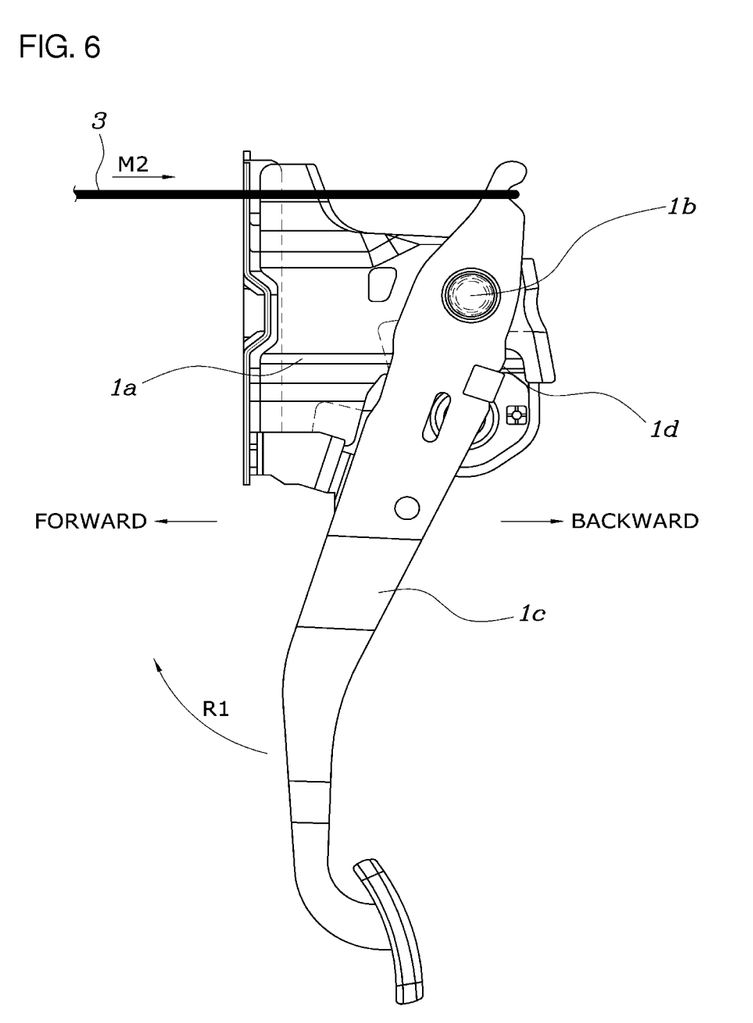

When the reverse return spring 30 is installed at the clutch pedal 1c, the clutch pedal 1c rotates forward by the elastic force of the reverse return spring 30 as illustrated in FIG. 6 (arrow R1) and the clutch cable 3 is pulled toward the lower portion at which the driver is positioned (arrow M2).

When the damper shoe 52b is supported to the front end of the support part 53b of the adjusting screw 53 by rotating the adjusting nut 53 as illustrated in FIG. 7 in the state of FIG. 6, the clutch cable 3 is pulled forward (arrow M3) and the clutch pedal 1c rotates backward (arrow R3) as illustrated in FIG. 8, such that the back surface 1d of the clutch pedal 1c contacts the pedal member 1a.

When the adjusting nut 53 rotates 90° more (arrow R4) as illustrated in FIG. 9 in the state of FIG. 7, the appearance of the damper shoe 52b and the appearance of the support groove 53c match each other in the same direction, the clutch cable 3 and the cable rod 40 are pulled (arrow M4) toward the front portion at which the release lever 2c is positioned, and the clutch pedal 1c rotates forward so that the back surface 1d of the clutch pedal 1c is spaced apart from the pedal member 1a.

Further, when the appearance of the damper shoe 52b and the appearance of the support groove 53c match each other in the same direction by the rotation of the adjusting nut 53 as illustrated in FIG. 9, the interval L1 is generated between the damper shoe 52b and the support groove 53c. In this case, the clutch pedal 1c rotates forward by the elastic force of the reverse return spring 30 as illustrated in FIG. 11 (arrow R5) to let the back surface 1d of the clutch pedal 1c be spaced apart from the pedal member 1a, and at the same time the clutch cable 3 and the cable rod 40 are pulled backward (arrow M5) and the adjusting nut 53 moves along with the cable rod 40 as illustrated in FIG. 10 to insert the damper shoe 52b into the support groove 53c, thereby generating the predetermined gap G1 between the back surface 1d of the clutch pedal 1c and the pedal member 1a as illustrated in FIG. 11.

As described above, the exemplary embodiment of the present invention rotates the clutch pedal 1c forward by using the elastic force of the reverse return spring 30 to allow the rear surface 1d of the clutch pedal 1c be spaced apart from the pedal member 1a, controls the length of the clutch cable 3 by using the mechanical clearance adjusting mechanism 50, and secures the uniform gap G1 between the pedal member 1a and the rear surface 1d of the clutch pedal 1c by adjusting the length of the clutch cable 3, thereby uniformly securing the free play and the surplus stroke of the clutch pedal 1c and improving the inferior quality of the released product.

Further, according to the exemplary embodiment of the present invention, when the driver steps on the clutch pedal 1c in the state in which the clutch pedal 1c returns to the initial position to apply the pedal effort, the elastic force of the reverse return spring 30 is applied in a direction in which the pedal effort of the driver is alleviated, thereby greatly reducing the fatigue of the driver due to the operation of the clutch pedal 1c.

Further, according to the exemplary embodiment of the present invention, the free play of the clutch pedal 1c is configured to become zero by the elastic force of the reverse return spring 30 to prevent the phenomenon that the slip occurs between the flywheel and the clutch disk upon the wear of the clutch disk and prevent the clutch disk from being damaged at an early stage, thereby greatly improving service life and promoting the fast responsiveness upon the operation of the clutch pedal 1c.

According to the apparatus for adjusting a clearance of a clutch cable for a vehicle according to the exemplary embodiment of the present invention, the clutch pedal may rotate forward by the elastic force of the reverse return spring to allow the back surface of the clutch pedal be spaced apart from the pedal member, the length of the clutch cable may be adjusted using the mechanical clearance adjusting mechanism, and the gap between the pedal member and the back surface of the clutch pedal may be uniformly secured by adjusting the length of the clutch cable.

Further, according to the exemplary embodiments of the present invention, the free play and the surplus stroke of the clutch pedal may be uniformly secured to improve the inferior quality of the released product.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. An apparatus for adjusting a clearance of a clutch cable between a pedal member and a clutch pedal of a vehicle, comprising:
   a reverse return spring configured to connect the pedal member to the clutch pedal and provide an elastic force to the clutch pedal to make a free play of the clutch pedal zero when the clutch pedal returns to an initial position;
   a cable rod connected to the clutch cable and having an end penetrating through a release lever; and
   a clearance adjusting mechanism configured to be coupled with the end of the cable rod and contact the release lever so as to adjust a gap between the pedal member and the clutch pedal by adjusting a length of the clutch cable in a state in which the clutch pedal rotates forward by the elastic force of the reverse return spring, wherein the clearance adjusting mechanism includes:
an end stopper configured to be connected to the release lever;
a middle member configured to be connected to the end stopper; and
an adjusting nut configured to be screw-connected to the cable rod and be connected to the middle member,
wherein when the middle member is disposed between the end stopper and the adjusting nut, the end of the cable rod penetrates the end stopper, the middle member, and the adjusting nut.

2. The apparatus of claim 1, wherein:
the clutch pedal is rotatably coupled with the pedal member forward and backward based on a hinge shaft,
the clutch cable is coupled with an upper portion of the clutch pedal which is positioned at an upper portion based on the hinge shaft, and
a lower portion of the clutch pedal rotates forward based on the hinge shaft by the elastic force of the reverse return spring and an upper portion thereof coupled with the clutch cable rotates backward.

3. The apparatus of claim 2, wherein the reverse return spring has one end coupled with a side surface of the pedal member and the other end coupled with a front surface of the clutch pedal while mounted on the hinge shaft of the clutch pedal.

4. The apparatus of claim 3, wherein both ends of the reverse return spring are configured to be positioned at the lower portion and the upper portion of the hinge shaft, respectively.

5. The apparatus of claim 1, wherein:
the end stopper and the middle member are movably installed along a length direction of the cable rod, and
the end of the cable rod is provided with a thread for screw-connection to the adjusting nut.

6. The apparatus of claim 5, wherein the end stopper is formed in a cylindrical shape, and
the end stopper formed in the cylindrical shape is installed in a right angle direction with respect to the length direction of the cable rod to increase a contact area with the release lever.

7. The apparatus of claim 6, wherein a portion of the release lever contacting the end stopper is formed in an arc-shaped curved groove corresponding to an appearance of the end stopper to increase a contact area with the end stopper.

8. The apparatus of claim 5, wherein the middle member includes:
a damper supported to the end stopper and including elasticity for vibration insulation, and
a damper shoe maintaining a shape of the damper,
wherein the end stopper and the damper, and the damper and the damper shoe each respectively have a surface contact therebetween to increase a contact area therebetween.

9. The apparatus of claim 8, wherein the damper is made of rubber for vibration insulation.

10. The apparatus of claim 8, wherein the damper shoe is made of plastic having strength to maintain the shape of the damper.

11. The apparatus of claim 8, wherein the adjusting nut includes:
a screw connection part screw-connecting with the thread of the cable rod; and
a support part integrally formed with the screw connection part and supporting the damper shoe, and
an end of the support part is provided with a support groove of an arc curved surface corresponding to the appearance of the damper shoe.

12. The apparatus of claim 8, wherein the pedal member is configured to contact a back surface of the clutch pedal such that when the damper shoe is separated from a support groove by the rotation of the adjusting nut, the damper shoe and the support groove have a matching appearance, and the clutch cable is configured to be pulled backward by the elastic force of the reverse return spring such that the adjusting nut moves together with the clutch cable to insert the damper shoe into the support groove, the clutch pedal rotates forward, and a predetermined gap is generated between a back surface of the clutch pedal and the pedal member.

13. The apparatus of claim 12, wherein the gap generated between the back surface of the clutch pedal and the pedal member has the same dimension as an interval between a lowest point of the damper shoe and a lowest point of the support groove in the state in which the appearance of the damper shoe and the appearance of the support groove match each other in the same direction by the rotation of the adjusting nut.

* * * * *